(12) United States Patent
Ee

(10) Patent No.: US 11,915,732 B1
(45) Date of Patent: Feb. 27, 2024

(54) HEAD GIMBAL ASSEMBLY FOR HARD DISK DRIVE DEVICE

(71) Applicant: Magnecomp Corporation, Murrieta, CA (US)

(72) Inventor: Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/212,586

(22) Filed: Jun. 21, 2023

(51) Int. Cl.
G11B 5/48 (2006.01)

(52) U.S. Cl.
CPC ............ *G11B 5/4826* (2013.01); *G11B 5/486* (2013.01); *G11B 5/4833* (2013.01); *G11B 5/4873* (2013.01)

(58) Field of Classification Search
CPC ..... G11B 5/4826; G11B 5/4833; G11B 5/486; G11B 5/4873
See application file for complete search history.

(56) References Cited

U.S. PATENT DOCUMENTS

| | | | |
|---|---|---|---|
| 5,282,103 A | 1/1994 | Hatch et al. |
| 5,333,085 A | 7/1994 | Prentice et al. |
| 5,530,606 A | 6/1996 | Baasch et al. |
| 5,771,136 A | 6/1998 | Girard |
| 5,892,637 A | 4/1999 | Brooks, Jr. et al. |
| 6,163,438 A | 12/2000 | Kajitani |
| 6,172,853 B1 | 1/2001 | Davis et al. |
| 6,233,121 B1 | 5/2001 | Pan |
| 6,320,729 B1 | 11/2001 | Coon |
| 6,424,498 B1 | 7/2002 | Patterson et al. |
| 6,483,670 B1 | 11/2002 | Watanabe |
| 6,538,850 B1 | 3/2003 | Hadian et al. |
| 6,556,383 B2 | 4/2003 | Murphy et al. |
| 6,611,402 B1 | 8/2003 | Mangold |
| 6,747,849 B1 | 6/2004 | Le et al. |
| 6,757,137 B1 | 6/2004 | Mei |
| 6,801,400 B2 | 10/2004 | Fu et al. |
| 6,885,523 B1 | 4/2005 | Summers et al. |
| 6,967,821 B2 | 11/2005 | Himes et al. |
| 6,995,953 B2 | 2/2006 | Mahoney et al. |

(Continued)

OTHER PUBLICATIONS

International Search Report and Written Opinion in International Application No. PCT/US2021/036642, dated Sep. 22, 2021.

(Continued)

*Primary Examiner* — Brian E Miller
(74) *Attorney, Agent, or Firm* — DLA Piper LLP (US)

(57) ABSTRACT

A gimbal having a base portion and a tongue joined together by a neck portion. The base portion includes a first proximal edge facing away from the tongue. A circuit is mounted on the gimbal and includes a portion mounted to the base portion having a circuit extension region that extends beyond the first proximal edge. The circuit extension region includes a second proximal edge facing away from the tongue. A slider may be mounted on the tongue and electrically connected to the circuit. First and second PZT actuators are mounted to the head gimbal assembly and electrically connected to the circuit. The circuit extension region has a circuit extension region width W of at least 0.1 mm as measured in a direction extending away from the tongue relative to a furthest extending portion of the first proximal edge and a furthest extending portion of the second proximal edge.

12 Claims, 6 Drawing Sheets

(56) References Cited

U.S. PATENT DOCUMENTS

| | | | |
|---|---|---|---|
| 7,006,333 | B1 | 2/2006 | Summers |
| 7,010,847 | B1 | 3/2006 | Hadian et al. |
| 7,085,104 | B1 | 8/2006 | Hadian et al. |
| 7,307,817 | B1 | 12/2007 | Mei |
| 7,551,401 | B1 | 6/2009 | Ciurea et al. |
| 7,719,797 | B1 | 5/2010 | Mei |
| 7,751,149 | B1 | 7/2010 | Mei |
| 7,852,604 | B2 * | 12/2010 | Sassine ............... G11B 5/4853 360/245.9 |
| 8,107,198 | B1 | 1/2012 | Ee |
| 8,446,695 | B1 | 5/2013 | Ee et al. |
| 9,025,282 | B1 | 5/2015 | Miller |
| 9,214,176 | B1 | 12/2015 | Sharma et al. |
| 10,276,195 | B2 | 4/2019 | Ee et al. |
| 10,566,016 | B2 * | 2/2020 | Yamada ............... G11B 21/21 |
| 11,043,236 | B1 * | 6/2021 | Pallay ............... G11B 5/4833 |
| 11,410,693 | B2 | 8/2022 | Ee et al. |
| 2001/0012182 | A1 | 8/2001 | Boutaghou et al. |
| 2003/0137774 | A1 | 7/2003 | Fu et al. |
| 2003/0202284 | A1 | 10/2003 | Arya |
| 2004/0070883 | A1 | 4/2004 | Mahoney et al. |
| 2005/0180052 | A1 | 8/2005 | Suzuki et al. |
| 2006/0034017 | A1 | 2/2006 | Agari et al. |
| 2006/0092571 | A1 | 5/2006 | Kang |
| 2006/0209466 | A1 | 9/2006 | Ono et al. |
| 2006/0274452 | A1 | 12/2006 | Arya |
| 2006/0274453 | A1 | 12/2006 | Arya |
| 2009/0244786 | A1 * | 10/2009 | Hatch ............... G11B 5/483 360/294.4 |
| 2010/0315744 | A1 | 12/2010 | Virmani et al. |
| 2014/0085754 | A1 * | 3/2014 | Hanya ............... G11B 5/4813 360/244.5 |
| 2014/0362476 | A1 * | 12/2014 | Miller ............... G11B 5/4833 360/245.7 |
| 2017/0316796 | A1 * | 11/2017 | Kumar ............... G11B 5/4846 |
| 2021/0151073 | A1 | 5/2021 | Yamada |
| 2021/0280209 | A1 * | 9/2021 | Suzuki ............... G11B 5/4846 |
| 2021/0390979 | A1 * | 12/2021 | Ee ............... G11B 5/59694 |
| 2022/0157337 | A1 * | 5/2022 | Aoki ............... G11B 5/4833 |

OTHER PUBLICATIONS

International Preliminary Report on Patentability in International Application No. PCT/US2021/036642, dated Dec. 22, 2022.
Office Action in U.S. Appl. No. 17/342,297, dated Dec. 20, 2021.
Office Action in U.S. Appl. No. 17/342,297, dated Jun. 10, 2022.
Office Action in U.S. Appl. No. 17/342,297, dated Aug. 24, 2022.
Office Action in U.S. Appl. No. 17/342,297, dated Feb. 15, 2023.
Office Action in U.S. Appl. No. 17/342,297, dated Jun. 1, 2023.

* cited by examiner

HEAD GIMBAL ASSEMBLY FOR HARD DISK DRIVE DEVICE

FIELD OF THE INVENTION

The present disclosure relates to hard disk drives, and more particularly to a head gimbal assembly and a suspension assembly for hard disk drives.

BACKGROUND OF THE INVENTION

A hard disk drive (HDD) is a non-volatile storage device that stores digitally encoded data on one or more circular disks having magnetic surfaces. In operation, each disk spins rapidly. Data is read from and written to the disk using a read-write head that is positioned over a specific data track or location on the disk surface by a suspension assembly, which in turn is attached to the arm of the head stack assembly, which is rotated by a voice coil motor or actuator integral to the head stack assembly. Keeping the read-write head stable, and aligned with a targeted data track upon the disk surface defines the primary function of the suspension assembly during hard disk drive operation. Optimized suspension assembly design and manufacture can minimize the effects of mechanical, thermal, and other off-track disturbances which can degrade the performance of the hard disk drive. The suspension assembly includes a load beam. In operation, the actuator positions the distal end of the load beam over the desired portion of the disk (e.g., one of the circular tracks on the disk surface). A gimbal assembly (also sometimes referred to as a flexure) is mounted on the distal end of the load beam. The assembly may further include components such as a slider containing the read-write head and microactuator devices (piezoelectric devices, also referred to as PZT herein) that rotate a portion of the gimbal assembly for fine positioning of the slider (as opposed to more coarse positioning of the slider by the actuator). The pressure caused by air viscosity between the slider and the spinning disk causes the slider to hover over (in close proximity to) the surface of the disk. While the load beam is relatively stiff, particularly in the lateral axis, the gimbal assembly is more flexible so that the slider can pitch and roll as it floats over the disk surface in order to maintain its operational distance immediately over the disk surface.

FIG. 1 illustrates a portion of a conventional head stack assembly 2, while FIGS. 2-3 illustrate a conventional head gimbal assembly 10 of the head stack assembly 2. The head stack assembly 2 includes a suspension assembly 3 with a load beam 4 terminating at a proximal end with a hinge 6 that is connected to a baseplate 8. A head gimbal assembly 10 is mounted on the distal end of the load beam 4. The baseplate 8 is connected to an actuator arm 12 of the head stack assembly 2, which is rotated by an integral actuator (not shown).

As best shown in FIGS. 2 and 3, head gimbal assembly 10 comprises a gimbal 14 of thin components of sheet metal (e.g., stainless steel), a circuit 16 that includes conductive traces (e.g., copper) and insulation material (e.g., polyimide), a slider 18 with the read/write head mounted on the gimbal 14 (e.g., by adhesive), and PZT actuators 20 mounted on the same side of the gimbal 14 as the slider 18. Circuit 16 extends along the load beam 4 and head gimbal assembly 10 for electrical signal communication to the read/write head of the slider 18 and to PZT actuators 20. The conductive traces of the circuit 16 are electrically insulated from the gimbal 14 by the insulation material of the circuit 16.

The gimbal 14 includes a base portion 14a and a tongue 14b, which are connected to each other by a neck portion 14c. The tongue 14b is configured to rotate about the neck portion 14c (for fine position control of the slider 18). The slider 18 is mounted on the tongue 14b. The PZT actuators 20 are mounted between the tongue 14b and the base portion 14a, for rotating the tongue 14b about the neck portion 14c when the PZT actuators 20 expand and contract in response to electrical signals provided by the circuit 16, which provides fine movement control of the slider 18 relative to the disk tracks during operation. In this example, the PZT actuators 20 are indirectly mounted on the gimbal 14, meaning that the PZT actuators 20 are mounted on the circuit 16, which is in turn mounted on the gimbal 14.

PZT actuators 20 can be multi-layer devices of piezoelectric material. A commonly used example of piezoelectric material can be lead zirconate titanate, although other piezoelectric materials are also used and known, which expand and contract in response to electronic signals. PZT materials can be brittle. When the suspension assembly 3 is not in use, it can be parked on a ramp to help protect the suspension assembly 3 from potentially damaging movement caused by non-operational shock events (e.g., caused when the HDD is roughly handled or dropped). However, during a non-operational shock event, the head gimbal assembly 10 can be damaged (e.g., the PZT material can suffer from cracking, and/or the circuit 16 can suffer from permanent deformation). Damage can result from large movement of the base portion 14a in the pitch direction, where the proximal edge of the base portion 14a may contact the load beam 4, causing undue stress on the PZT actuators 20.

There is a need for a head gimbal assembly design that is less susceptible to damage from non-operational shock events.

BRIEF SUMMARY OF THE INVENTION

The aforementioned problems and needs are addressed by a head gimbal assembly that includes a gimbal having a base portion and a tongue that are joined together by a neck portion, wherein the base portion includes a first proximal edge facing away from the tongue, a circuit mounted on the gimbal, wherein the circuit includes a portion mounted to the base portion that includes a circuit extension region that extends beyond the first proximal edge of the base portion, wherein the circuit extension region includes a second proximal edge facing away from the tongue, and a first PZT actuator and a second PZT actuator mounted to the head gimbal assembly and electrically connected to the circuit, for displacing the tongue relative to the base portion. The head gimbal assembly may also include a slider mounted on the tongue, and electrically connected to the circuit. The circuit extension region has a circuit extension region width W of at least 0.1 mm as measured in a direction extending away from the tongue relative to a furthest extending portion of the first proximal edge in the direction extending away from the tongue and a furthest extending portion of the second proximal edge in the direction extending away from the tongue.

In other embodiments, a suspension assembly is provided comprising generally a baseplate; a load beam connected to the baseplate by a hinge; a gimbal mounted to the load beam, wherein the gimbal comprises a base portion and a tongue that are joined together by a neck portion, wherein the base portion includes a first proximal edge facing away from the tongue. A circuit is mounted on the gimbal, wherein the circuit includes a portion mounted to the base portion that includes a circuit extension region that extends beyond the first proximal edge of the base portion, wherein the circuit extension region includes a second proximal edge facing away from the tongue; and a first PZT actuator and a second PZT actuator mounted to the suspension assembly and electrically connected to the circuit, for displacing the tongue relative to the base portion. The circuit extension region has a circuit extension region width W of at least 0.1 mm as measured in a direction extending away from the tongue relative to a furthest extending portion of the first proximal edge in the direction extending away from the tongue and a furthest extending portion of the second proximal edge in the direction extending away from the tongue.

Other objects and features of the present disclosure will become apparent by a review of the specification, claims and appended figures.

DETAILED DESCRIPTION OF THE INVENTION

Figure 1:
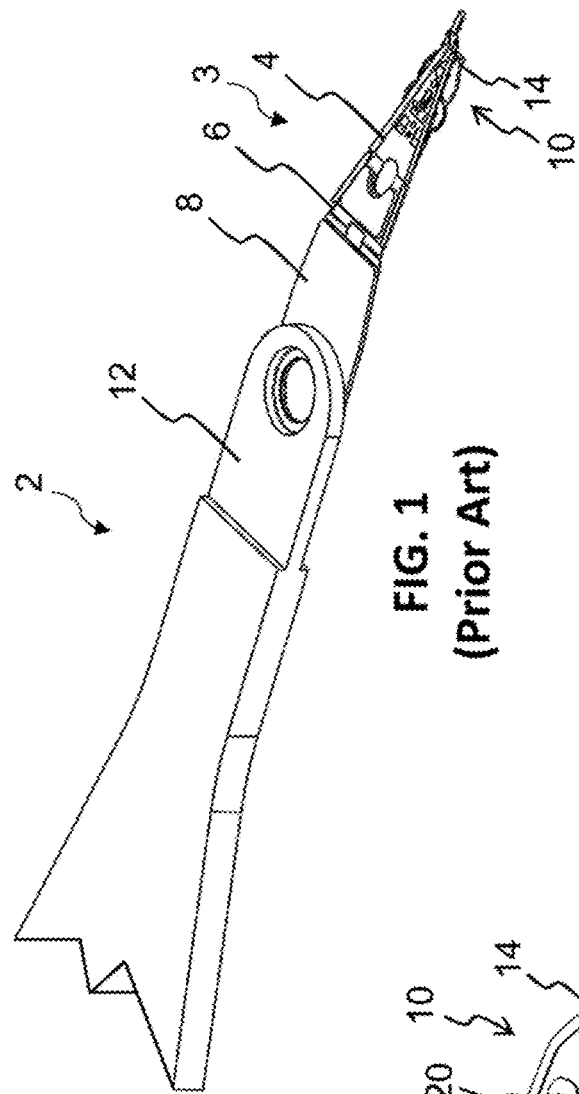
FIG. 1 is a partial perspective view of a conventional head suspension assembly.
Figure 3:
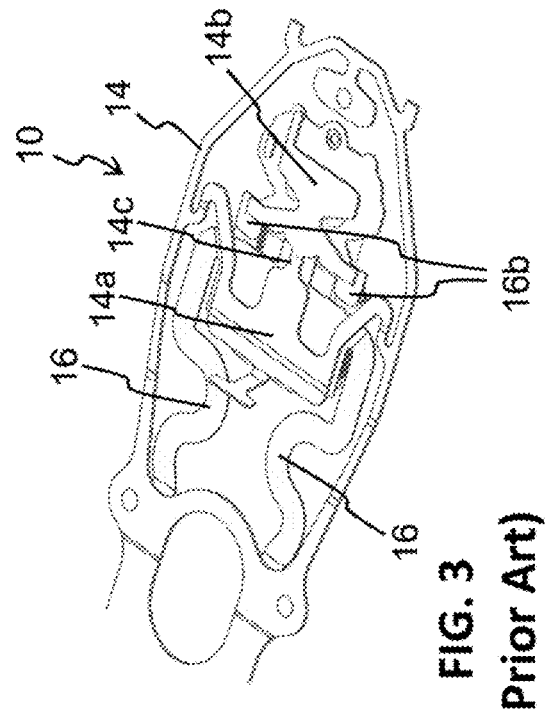
FIG. 3 is a top view of a conventional head gimbal assembly.
Figure 2:
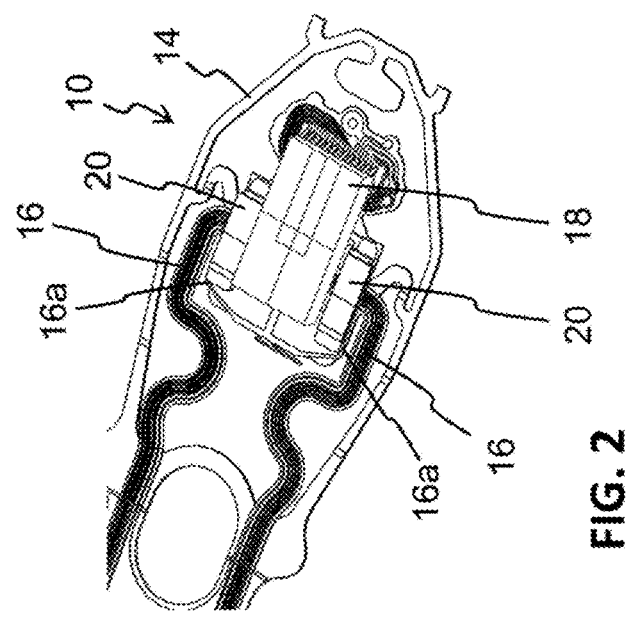
FIG. 2 is a bottom view of a conventional head gimbal assembly.

It has been discovered by the present inventors that by providing a circuit extension region that extends the circuit beyond the proximal edge of the base portion of the gimbal by at least a certain width dimension provides a significant reduction of stress on the PZT actuators during non-operational shock events. Such a gimbal can be used with the head stack assembly 2 shown in FIG. 1.

Figure 4:
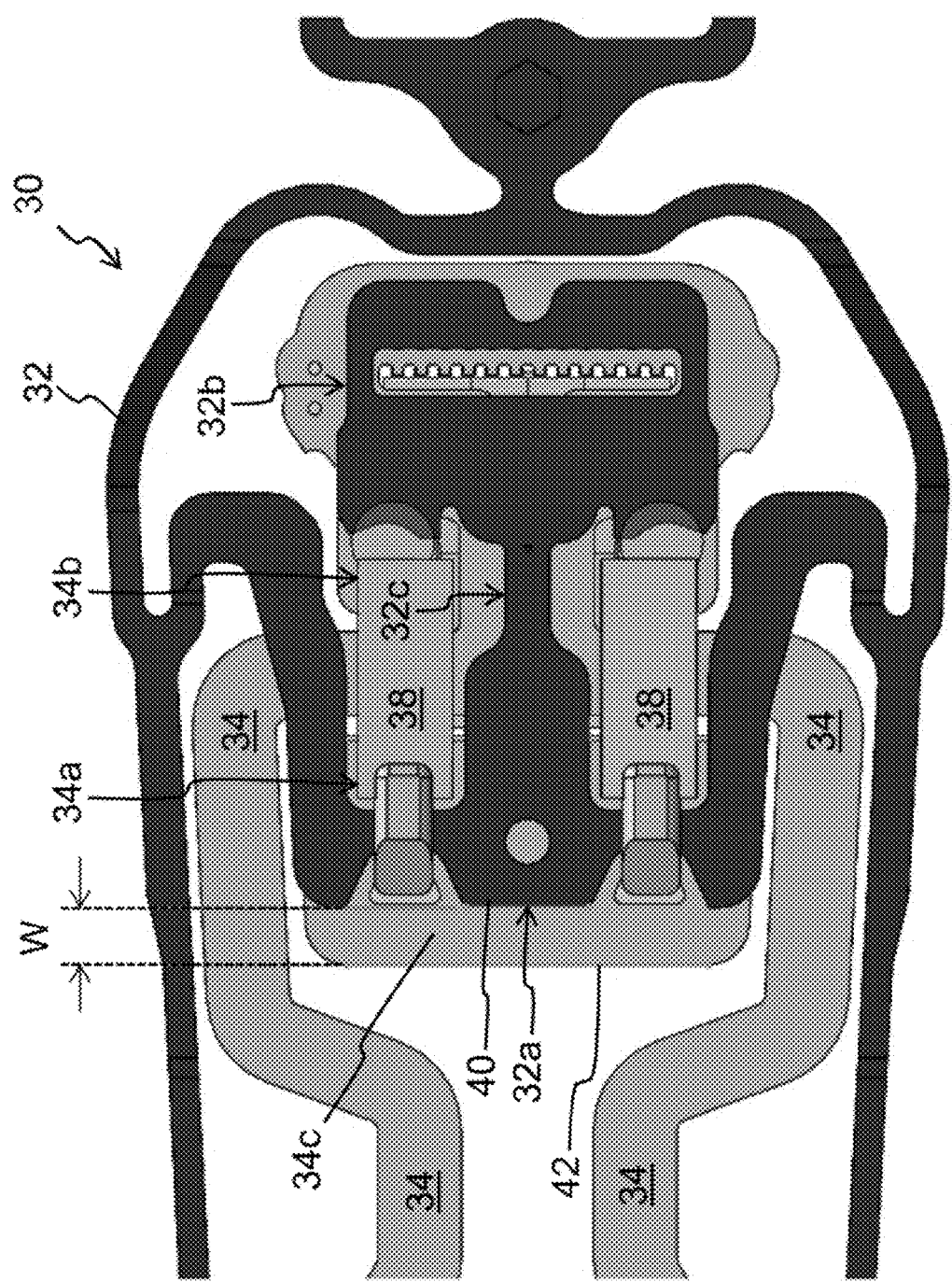
FIG. 4 is a top view of an example of a head gimbal assembly according to some embodiments of the present disclosure.
Figure 5:
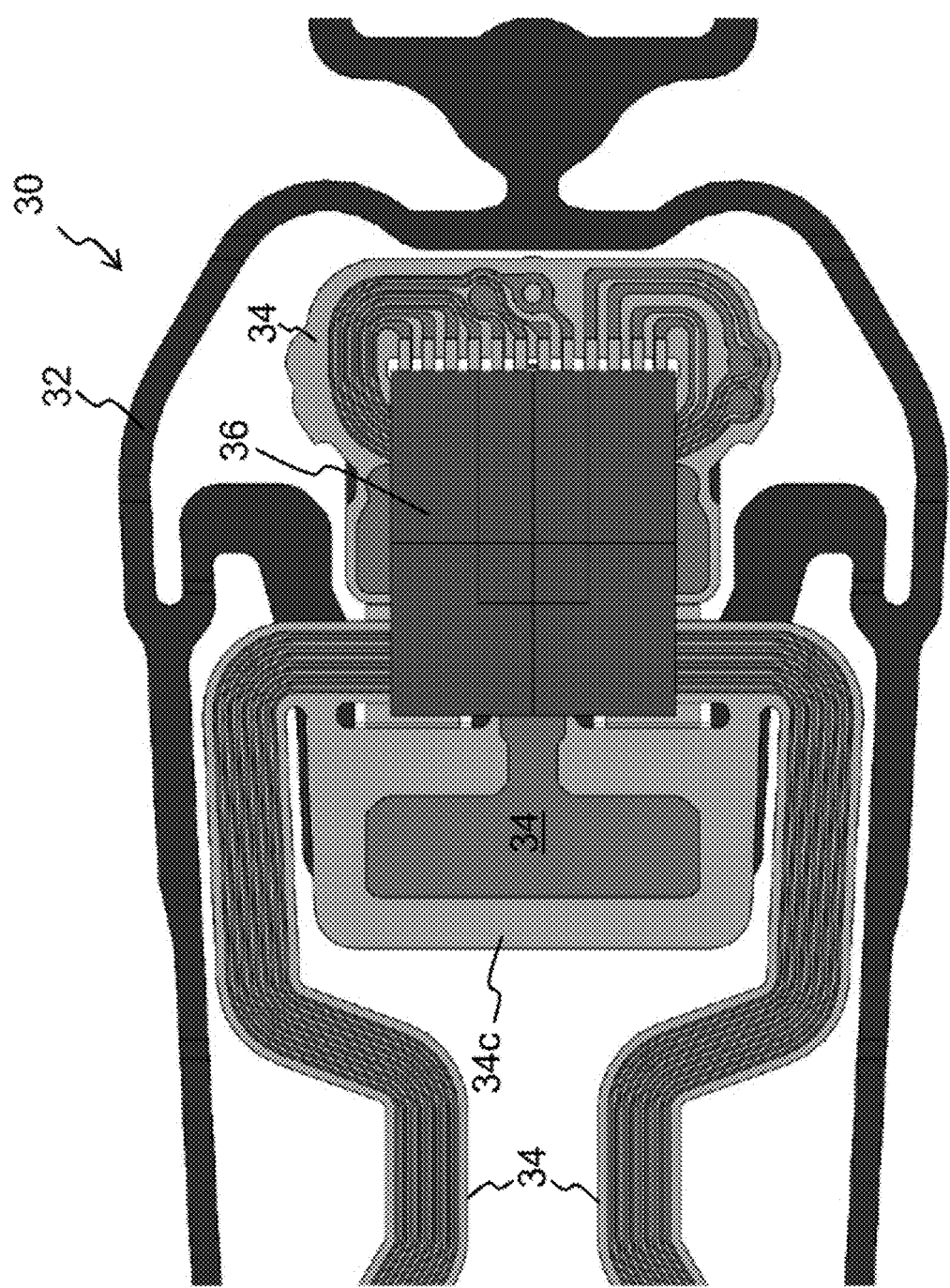
FIG. 5 is a bottom view of the example of a head gimbal assembly according to some embodiments of the present disclosure.

FIGS. 4 and 5 illustrate top and bottom views, respectively, of a head gimbal assembly 30 according to one example, which is compatible with the head stack assembly 2 and suspension assembly 3 discussed above (i.e., the head gimbal assembly 30 can be mounted on the load beam 4 discussed above with respect to FIG. 1). Head gimbal assembly 30 includes a gimbal 32, forming thin components of sheet metal. The gimbal 32 may be formed of stainless steel. A circuit 34 is mounted or otherwise attached to the gimbal 32, and includes conductive traces and insulation material. The conductive traces can be copper, and the insulation material can be polyimide. A slider 36 is mounted on the gimbal 32, and includes a read/write head. The slider 36 can be mounted on the gimbal 32 by an adhesive.

The gimbal 32 includes a base portion 32a and a tongue 32b, which are joined together by a neck portion 32c. The slider 36 is mounted on the tongue 32b (either directly to the tongue, or indirectly to the tongue with the slider 36 directly mounted on the circuit 34 and the circuit 34 is directly mounted on the tongue 32b such that the circuit 34 is disposed between the slider 36 and the tongue 32b). The tongue 32b is configured to rotate or otherwise be displaced relative to the base portion 32a about the neck portion 32c, in order to provide relatively small movements of the slider 36 for fine position control of the slider 36 during operation. PZT actuators 38 are mounted between the tongue 32b and the base portion 32a, for rotating or otherwise displacing the tongue 32b (and the slider 36 mounted thereto) relative to the base portion 32a about the neck portion 32c when the PZT actuators 38 expand and contract in response to electrical signals provided by the circuit 34 (for providing fine positioning control of the slider 36 relative to the disk tracks during operation).

The circuit 34, slider 36 and PZT actuators 38 can all be mounted on the same side (i.e., a first side or bottom side) of the gimbal 52. Alternatively, as shown in FIGS. 4-5, the PZT actuators 38 can be mounted on an opposite side (i.e., a second side or top side) of the gimbal 32 while the circuit 34 and slider 36 are mounted on the first side of the gimbal 32. In this example, the PZT actuators 38 are indirectly mounted on the gimbal 32, meaning that the PZT actuators 38 are mounted to bonding sites 34a/34b of the circuit 34, and the circuit 34 is mounted on the gimbal 32. Specifically, bonding sites 34a are those portions of circuit 34 to which the proximal ends of the PZT actuators 38 are mounted (adjacent the base portion 32a), and bonding sites 34b are those portions of circuit 34 to which the distal ends of PZT actuators 38 are mounted (adjacent the tongue 32b). Therefore, the forces of expansion and contraction of the PZT actuators 38 used to displace the tongue 32b are translated to the base portion 32a and tongue 32b via the circuit 34.

Circuit 34 extends along and is mounted on the gimbal 32, for conveying electrical signals to and from the read/write head of the slider 36, and conveying electrical signals to the PZT actuators 38 for fine positioning control of the slider 36. Therefore, the circuit 34 is electrically connected to the electrodes of the PZT actuators 38 (for providing signals that cause the PZT actuators to expand and contract) and to the slider 36 (for conveying signals to and from the slider 36 to conduct operations such a reading and writing).

The present inventors have discovered that having the portion of the circuit 34 mounted to the base portion 32a include a circuit extension region 34c, which is that portion of the circuit 34 that extends beyond a first proximal edge 40 of the base portion 32a, where the circuit extension region 34c has a circuit extension region width W of at least 0.1 mm, a significant reduction in the maximum stress on the PZT actuators 38 and the rest of the head gimbal assembly 30 in the event of a non-operation shock event can be achieved. Circuit extension region width W is the width of the circuit extension region 34c (as measured in the direction extending away from tongue 32b) relative to the furthest extending portion of the first proximal edge 40 of base portion 32a (in the direction extending away from tongue 32b), and the furthest extending portion of the second proximal edge 42 of the circuit extension region 34c (in the direction extending away from tongue 32b). Both first proximal edge 40 and second proximal edge 42 face away from tongue 32b. The circuit extension region 34c includes the insulation material of the circuit 34, but not electrical traces of the circuit 34. Having the circuit extension region 34c include only the more flexible insulation material and not the more rigid electrical traces provides better performance.

Figure 6:
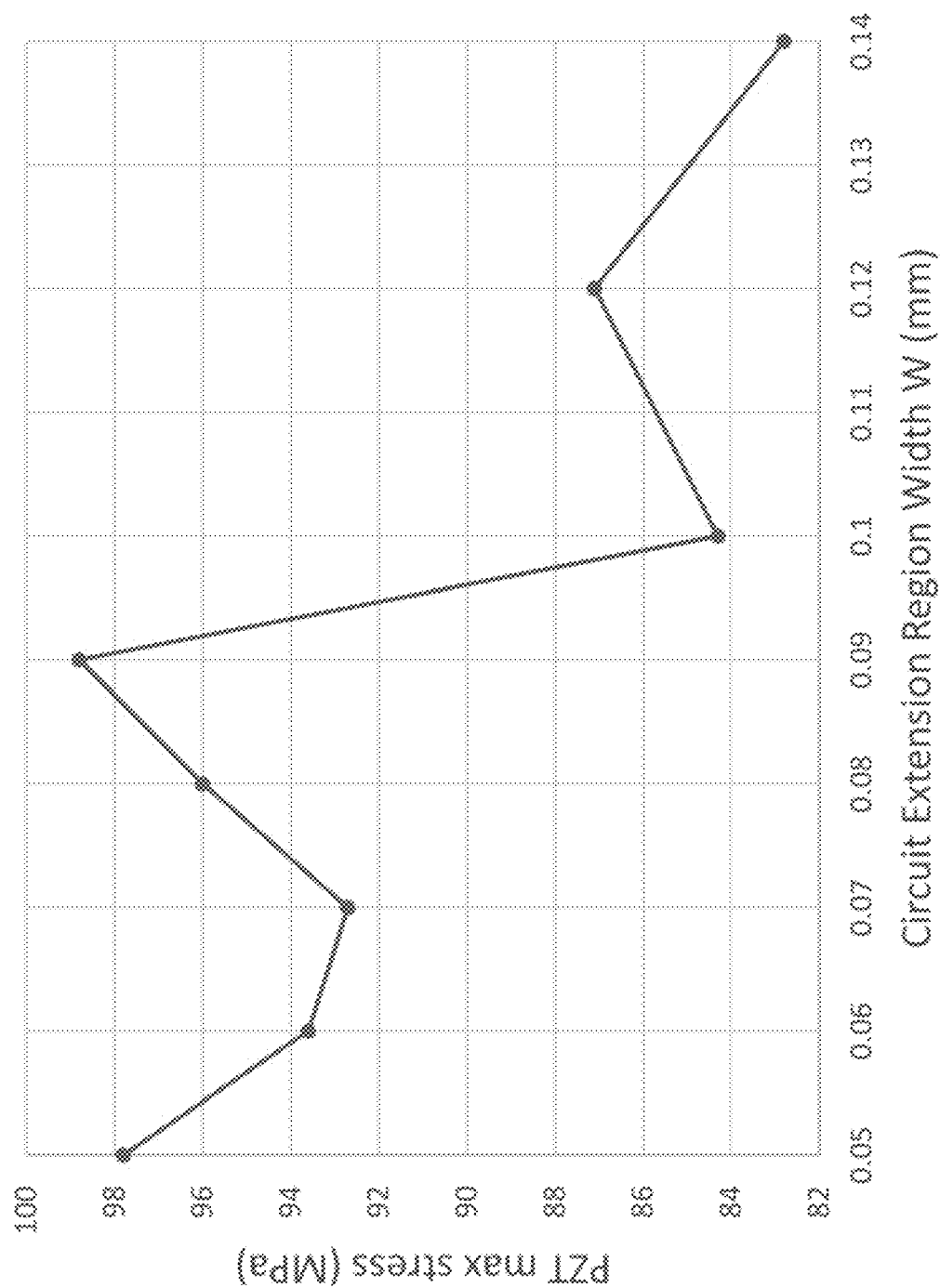
FIG. 6 is a graphical representation of PZT maximum stress as a function of circuit extension region width W, for the head gimbal assembly of FIGS. 4-5.

FIG. 6 shows the relationship between maximum stress on the PZT actuators from non-operational shock as a function of circuit extension region width W, where the present inventors have discovered there is a significant and unexpected drop of maximum stress as circuit extension region width W reaches at least 0.1 mm. This drop in the maximum stress can be attributed to the fact the insulation material of circuit 34 is more flexible than gimbal 32, so if the circuit extension region width W is sufficiently large, then there is sufficient insulation material of the circuit 34 to contact with the load beam during a non-operational shock event and to absorb the energy of collisions between the gimbal assembly 30 and the load beam 4 to significantly reduce any resulting stresses on the PZT actuators 38. The benefits of significant shock reduction are achieved when the circuit extension region width W meets or exceeds 0.1 mm. Therefore, by having the portion of the circuit 34 mounted to the base portion 32 include a circuit extension region 34c having a circuit extension region width W of at least 0.1 mm, the maximum stress from non-operational shock events can be significantly reduced, and damage to the PZT actuators and/or the head gimbal assembly 30 can be avoided.

Figure 7:
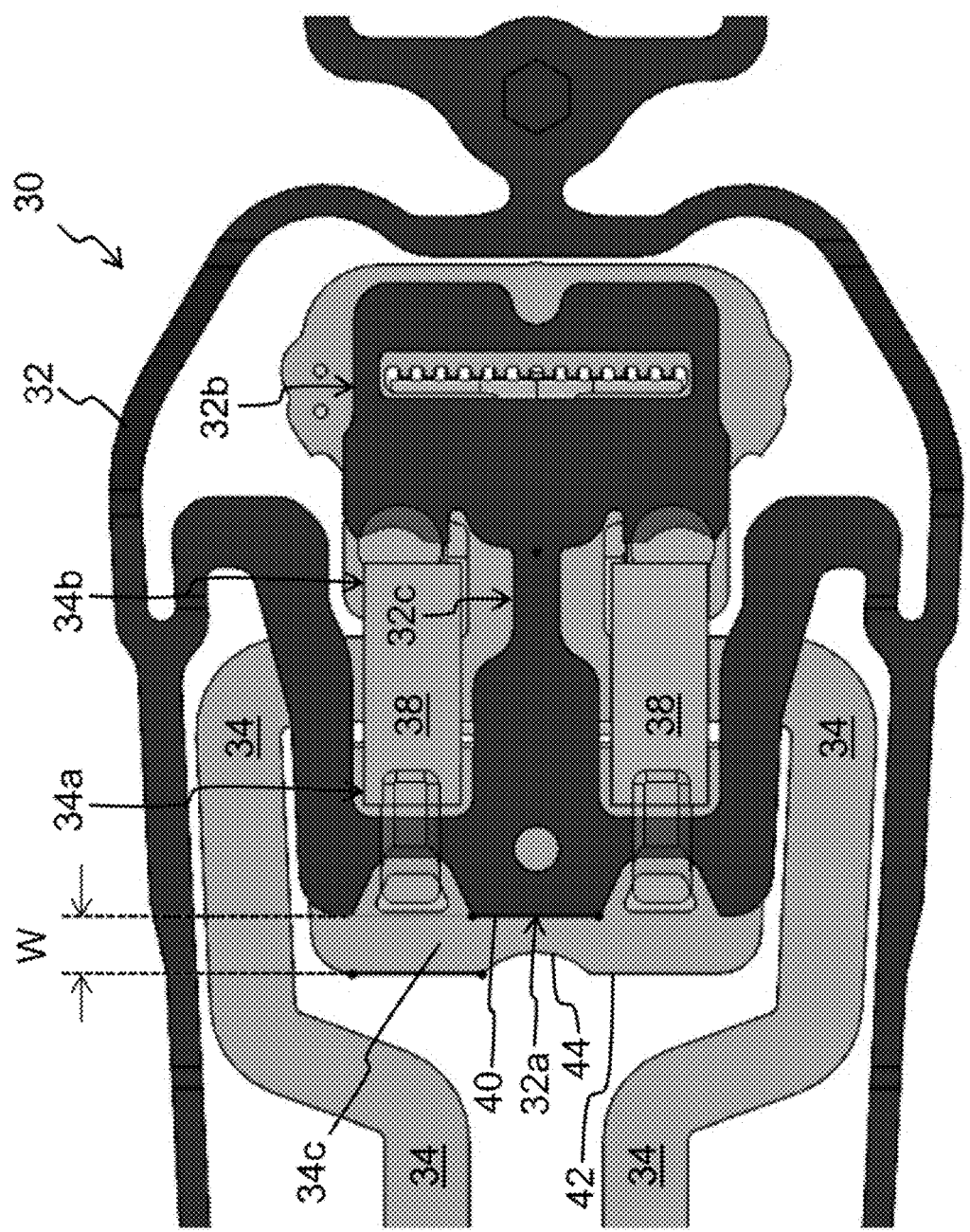
FIG. 7 is a top view of a second example of a head gimbal assembly according to some embodiments of the present disclosure.
Figure 8:
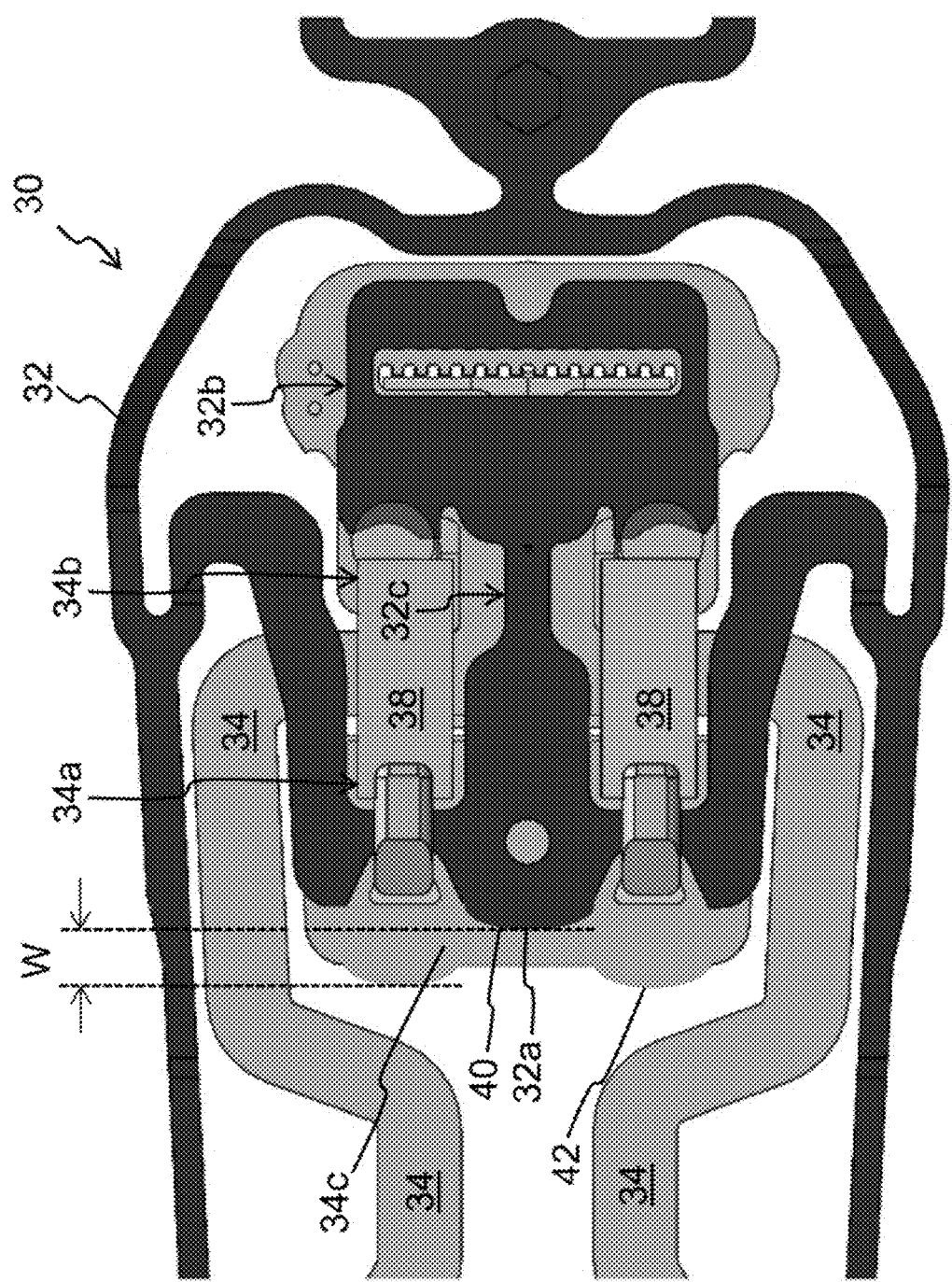
FIG. 8 is a top view of a third example of a head gimbal assembly according to some embodiments of the present disclosure.

In the example of FIG. 6, proximal edge 40 of base portion 32a is not linear, while proximal edge 42 of the circuit extension region 34c is substantially linear. However, proximal edge 42 of the circuit extension region 34c need not be substantially linear. FIG. 7 is a second example of a head gimbal assembly 30, where the proximal edge 42 of the circuit extension region 34c is not linear but instead includes a cut-out 44, which may be desirable to avoid blocking an alignment feature on load beam 4. FIG. 8 is a third example of a head gimbal assembly, where the furthest extending portion of the first proximal edge 40 of base portion 32a (in the direction extending away from tongue 32b) is offset from the furthest extending portions of the second proximal edge 42 of the circuit extension region 34c (in the direction extending away from tongue 32b).

It is to be understood that the present disclosure is not limited to the example(s) described above and illustrated herein, but encompasses any and all variations falling within the scope of any claims. For example, references to the present invention, embodiments or examples herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A head gimbal assembly comprising:
    a gimbal having a base portion and a tongue that are joined together by a neck portion, wherein the base portion includes a first proximal edge facing away from the tongue;
    a circuit mounted on the gimbal, wherein the circuit includes a portion mounted to the base portion that includes a circuit extension region that extends beyond the first proximal edge of the base portion, wherein the circuit extension region includes a second proximal edge facing away from the tongue; and
    a first PZT actuator and a second PZT actuator mounted to the head gimbal assembly and electrically connected to the circuit, for displacing the tongue relative to the base portion;
    wherein the circuit extension region has a circuit extension region width W of at least 0.1 mm as measured in a direction extending away from the tongue relative to a furthest extending portion of the first proximal edge in the direction extending away from the tongue and a furthest extending portion of the second proximal edge in the direction extending away from the tongue.

2. The head gimbal assembly of claim 1, wherein the circuit comprises electrical traces and insulation material, and wherein the circuit extension region of the circuit comprises the insulation material without electrical traces.

3. The head gimbal assembly of claim 1, wherein:
    the first PZT actuator has a proximal end mounted on a first bonding site of the circuit and a distal end mounted on a second bonding site of the circuit; and
    the second PZT actuator has a proximal end mounted on a third bonding site of the circuit and a distal end mounted on a fourth bonding site of the circuit.

4. The head gimbal assembly of claim 3, wherein:
    the first bonding site and the third bonding site are adjacent the base portion; and
    the second bonding site and the fourth bonding site are adjacent the tongue.

5. The head gimbal assemble of claim 1, further comprising:
    a slider mounted on the tongue, and electrically connected to the circuit.

6. The head gimbal assembly of claim 5, wherein:
    the circuit is disposed between the slider and the tongue.

7. A suspension assembly comprising:
    a baseplate;
    a load beam connected to the baseplate by a hinge;
    a gimbal mounted to the load beam, wherein the gimbal comprises a base portion and a tongue that are joined together by a neck portion, wherein the base portion includes a first proximal edge facing away from the tongue;
    a circuit mounted on the gimbal, wherein the circuit includes a portion mounted to the base portion that includes a circuit extension region that extends beyond the first proximal edge of the base portion, wherein the circuit extension region includes a second proximal edge facing away from the tongue; and
    a first PZT actuator and a second PZT actuator mounted to the suspension assembly and electrically connected to the circuit, for displacing the tongue relative to the base portion;
    wherein the circuit extension region has a circuit extension region width W of at least 0.1 mm as measured in a direction extending away from the tongue relative to a furthest extending portion of the first proximal edge in the direction extending away from the tongue and a furthest extending portion of the second proximal edge in the direction extending away from the tongue.

8. The suspension assembly of claim 7, wherein the circuit comprises electrical traces and insulation material, and wherein the circuit extension region of the circuit comprises the insulation material without electrical traces.

9. The suspension assembly of claim 7, wherein:
    the first PZT actuator has a proximal end mounted on a first bonding site of the circuit and a distal end mounted on a second bonding site of the circuit; and
    the second PZT actuator has a proximal end mounted on a third bonding site of the circuit and a distal end mounted on a fourth bonding site of the circuit.

10. The suspension assembly of claim 9, wherein:
the first bonding site and the third bonding site are adjacent the base portion; and
the second bonding site and the fourth bonding site are adjacent the tongue.

11. The suspension assembly of claim 7, further comprising:
a slider mounted on the tongue, and electrically connected to the circuit.

12. The suspension assembly of claim 11, wherein:
the circuit is disposed between the slider and the tongue.

\* \* \* \* \*